(12) United States Patent
Madden et al.

(10) Patent No.: US 12,480,656 B2
(45) Date of Patent: *Nov. 25, 2025

(54) AIRCRAFT FUELLING

(71) Applicant: ROLLS-ROYCE plc, London (GB)

(72) Inventors: Christopher P Madden, Derby (GB); Craig W Bemment, Derby (GB); Andrew T Smith, Derby (GB); Peter Swann, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/882,197

(22) Filed: Sep. 11, 2024

(65) Prior Publication Data

US 2025/0003592 A1    Jan. 2, 2025

Related U.S. Application Data

(63) Continuation of application No. 18/211,622, filed on Jun. 20, 2023, now Pat. No. 12,111,055.

(30) Foreign Application Priority Data

Dec. 21, 2022 (GB) .................................... 2219384

(51) Int. Cl.
*F23R 3/28* (2006.01)
*B64D 27/10* (2006.01)
*F02C 7/264* (2006.01)

(52) U.S. Cl.
CPC ............. *F23R 3/28* (2013.01); *B64D 27/10* (2013.01); *F02C 7/264* (2013.01); *F05D 2240/35* (2013.01)

(58) Field of Classification Search
CPC .. F02C 7/26; F02C 7/262; F02C 7/264; F23R 3/42; F23R 3/46; F23R 3/50
See application file for complete search history.

(56) References Cited

U.S. PATENT DOCUMENTS 6,148,603 A    11/2000 Althaus
6,201,029 B1    3/2001 Waycuilis
(Continued)

FOREIGN PATENT DOCUMENTS

WO    2014/200580 A1    12/2014

OTHER PUBLICATIONS

Apr. 3, 2025 Notice of Allowance received in U.S. Appl. No. 18/421,471.
(Continued)

*Primary Examiner* — Thuyhang N Nguyen
(74) *Attorney, Agent, or Firm* — Oliff PLC

(57) ABSTRACT

A method of operating a gas turbine engine; the gas turbine engine includes a combustor. The combustor includes a combustion chamber and a plurality of fuel spray nozzles configured to inject fuel into the combustion chamber. The plurality of fuel spray nozzles includes a first subset of fuel spray nozzles and a second subset of fuel spray nozzles. The combustor is operable in a condition in which the first subset of fuel spray nozzles are supplied with more fuel than the second subset of fuel spray nozzles. A ratio of the number of fuel spray nozzles in the first subset of fuel spray nozzles to the number of fuel spray nozzles in the second subset of fuel spray nozzles is in the range of 1:2 to 1:5. The method includes: providing fuel to the one or more fuel-oil heat exchangers. Also provided is a gas turbine engine for an aircraft.

14 Claims, 6 Drawing Sheets

(56) References Cited

U.S. PATENT DOCUMENTS

| | | | |
|---|---|---|---|
| 6,962,055 B2 | 11/2005 | Chen et al. | |
| 6,968,699 B2 * | 11/2005 | Howell | F23R 3/343 60/776 |
| 7,107,772 B2 | 9/2006 | Chen et al. | |
| 9,739,198 B2 | 8/2017 | Gameiro et al. | |
| 9,759,130 B2 | 9/2017 | Appukuttan et al. | |
| 10,100,746 B2 | 10/2018 | Foster | |
| 10,234,142 B2 | 3/2019 | Patel et al. | |
| 10,612,467 B2 | 4/2020 | Keeler et al. | |
| 11,181,274 B2 | 11/2021 | Danis et al. | |
| 11,306,661 B1 | 4/2022 | Brightwell et al. | |
| 11,585,278 B1 | 2/2023 | Swann et al. | |
| 11,585,282 B1 | 2/2023 | Swann et al. | |
| 11,591,973 B1 | 2/2023 | Swann et al. | |
| 11,643,979 B1 | 5/2023 | Bemment et al. | |
| 11,994,072 B1 | 5/2024 | Bemment et al. | |
| 12,111,055 B2 | 10/2024 | Madden et al. | |
| 2001/0047650 A1 * | 12/2001 | Muller | F23R 3/343 60/776 |
| 2004/0221582 A1 | 11/2004 | Howell et al. | |
| 2004/0255594 A1 | 12/2004 | Baino et al. | |
| 2005/0115244 A1 | 6/2005 | Griffin et al. | |
| 2008/0271456 A1 | 11/2008 | Scully et al. | |
| 2010/0319359 A1 | 12/2010 | Holt et al. | |
| 2011/0185703 A1 | 8/2011 | Dodo et al. | |
| 2012/0260664 A1 | 10/2012 | Harding | |
| 2012/0271527 A1 | 10/2012 | Zebrowski et al. | |
| 2013/0098041 A1 | 4/2013 | Zhang et al. | |
| 2013/0125556 A1 | 5/2013 | Hoke et al. | |
| 2014/0137558 A1 | 5/2014 | Toronto | |
| 2016/0161123 A1 | 6/2016 | Patel et al. | |
| 2016/0281656 A1 | 9/2016 | Alecu et al. | |
| 2016/0332743 A1 | 11/2016 | Teicholz et al. | |
| 2017/0159569 A1 | 6/2017 | Miller et al. | |
| 2018/0163629 A1 | 6/2018 | Proscia | |
| 2022/0290863 A1 | 9/2022 | Naik et al. | |
| 2022/0333534 A1 | 10/2022 | Smith et al. | |
| 2023/0024316 A1 | 1/2023 | Ribeiro et al. | |
| 2023/0192303 A1 | 6/2023 | Swann et al. | |
| 2023/0193834 A1 | 6/2023 | Keeler et al. | |
| 2023/0193835 A1 | 6/2023 | Swann et al. | |
| 2023/0279808 A1 | 9/2023 | Swann | |
| 2023/0323820 A1 | 10/2023 | Swann et al. | |
| 2023/0323823 A1 | 10/2023 | Swann et al. | |
| 2023/0324319 A1 | 10/2023 | Bemment et al. | |
| 2024/0209785 A1 | 6/2024 | Bemment et al. | |
| 2024/0209792 A1 | 6/2024 | Madden et al. | |
| 2024/0210038 A1 | 6/2024 | Madden et al. | |
| 2024/0287937 A1 | 8/2024 | Bemment et al. | |

OTHER PUBLICATIONS

Yang et al. "An overview on performance characteristics of bio-jet fuels", IPC Science and Technology Press, Fuel, vol. 237, pp. 916-936 (Oct. 16, 2018).

Huq et al. "Toward net-zero sustainable aviation fuel with wet waste-derived volatile fatty acids", PNAS, vol. 118, No. 13, pp. 1-11 (Mar. 15, 2021).

Fortin, T. & Laesecke, A (2015). Viscosity Measurements of Aviation Turbine Fuels. American Chemical Society. pp. 1-10. (Year : 2015—sufficiently early that month is not at issue).

* cited by examiner

AIRCRAFT FUELLING

CROSS-REFERENCE TO RELATED APPLICATIONS

This application is a continuation of U.S. Ser. No. 18/211,622, filed Jun. 20, 2023, which is based upon and claims the benefit of priority from UK Patent Application Number 2219384.1 filed on 21 Dec. 2022, the entire contents of the prior applications being incorporated herein by reference.

BACKGROUND

Field of the Disclosure

The present disclosure relates to a method of operating a gas turbine engine using fuels different from traditional kerosene-based jet fuels.

Description of the Related Art

There is an expectation in the aviation industry of a trend towards the use of fuels different from the traditional kerosene-based jet fuels generally used at present. These fuels may have different fuel characteristics relative to such petroleum-based hydrocarbon fuels.

Thus, there is a need to take account of fuel properties of these different fuels and to adjust methods of operating gas turbine engines accordingly.

SUMMARY

According to a first aspect, there is provided a method of operating a gas turbine engine, the gas turbine engine comprising:
  a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which the first subset of fuel spray nozzles is supplied with more fuel than the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5;
  the method comprising:
  providing a fuel to the plurality of fuel spray nozzles having a calorific value of at least 43.5 MJ/kg.

According to a second aspect, there is provided a gas turbine engine for an aircraft, comprising:
  a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which the first subset of fuel spray nozzles is supplied with more fuel than the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and
  a fuel distribution system configured to provide a fuel to the plurality of fuel spray nozzles, wherein the fuel has a calorific value of at least 43.5 MJ/kg.

The inventors appreciated that the use of fuels different from the traditional kerosene-based jet fuels, such as sustainable aviation fuels, may result in different fuel properties. Fuels with a higher calorific value may have a greater thermal stability, allowing the fuel to take in more heat, so providing improved oil cooling and/or improved combustion properties in the combustor. Higher calorific value of a fuel also reduces the required fuel burn rate for a given speed at cruise conditions.

According to a third aspect, there is provided a method of operating a gas turbine engine, the gas turbine engine comprising:
  a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which the first subset of fuel spray nozzles is supplied with more fuel than the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and
  one or more fuel-oil heat exchangers;
  the method comprising:
  providing a fuel to the one or more fuel-oil heat exchangers;
  transferring heat from oil to the fuel in the one or more fuel-oil heat exchangers; and
  providing the fuel from the one or more fuel-oil heat exchangers to the plurality of fuel spray nozzles; wherein heat is transferred from the oil to the fuel in the one or more fuel-oil heat exchangers to raise a temperature of the fuel to an average of at least 135° C. on injection of the fuel into the combustion chamber at cruise conditions.

According to a fourth aspect, there is provided a gas turbine engine for an aircraft, comprising:
  a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which the first subset of fuel spray nozzles is supplied with more fuel than the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and
  a fuel distribution system configured to provide a fuel to the plurality of fuel spray nozzles, comprising one or more fuel-oil heat exchangers and a controller; wherein the controller is configured to control the one or more fuel-oil heat exchangers so as to raise a temperature of the fuel to an average of at least 135° C. on injection of the fuel into the combustion chamber at cruise conditions.

The inventors have appreciated that fuel temperature has an effect on combustion of the fuel within the combustor. Some fuels different from the traditional kerosene-based jet fuels, such as sustainable aviation fuels, may be heated to higher temperatures than traditional fuels without significantly increasing coking. That may improve efficiency without causing excess levels of coking. The fuel temperature must therefore be taken into account when delivering fuel to the combustor in order to balance combustion efficiency with coking levels.

According to a fifth aspect, there is provided a method of operating a gas turbine engine, the gas turbine engine comprising:
- a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which the first subset of fuel spray nozzles is supplied with more fuel than the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and
- one or more fuel-oil heat exchangers;
- the method comprising:
- providing a fuel to the one or more fuel-oil heat exchangers;
- transferring heat from oil to the fuel in the one or more fuel-oil heat exchangers; and
- providing the fuel from the one or more fuel-oil heat exchangers to the plurality of fuel spray nozzles; wherein transferring heat from the oil to the fuel comprises transferring 200-600 kW/m$^3$ of heat from oil to the fuel in the one or more fuel-oil heat exchangers at cruise conditions before providing the fuel to the plurality of fuel spray nozzles.

According to a sixth aspect, there is provided a gas turbine engine for an aircraft, comprising:
- a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which the first subset of fuel spray nozzles is supplied with more fuel than the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and
- a fuel distribution system configured to provide a fuel to the plurality of fuel spray nozzles, comprising one or more fuel-oil heat exchangers and a controller; wherein the controller is configured to control the one or more fuel-oil heat exchangers so as to transfer 200-600 kW/m$^3$ of heat from oil to the fuel at cruise conditions before the fuel is provided to the plurality of fuel spray nozzles.

The inventors have appreciated that the amount of heat that is transferred to the fuel by heat exchangers provided in a gas turbine engine has an effect on combustion of the fuel within the combustor. Some fuels different from the traditional kerosene-based jet fuels, such as sustainable aviation fuels, may be able to receive more heat and be heated to higher temperatures than traditional fuels without significantly increasing coking. That may improve combustion efficiency of the fuel without causes excess levels of coking. The amount of heat that is transferred to fuel within a fuel-oil heat exchanger must therefore be taken into account when delivering fuel to the combustor in order to balance combustion efficiency with coking levels.

According to a seventh aspect, there is provided a method of operating a gas turbine engine, the gas turbine engine comprising:
- a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which the first subset of fuel spray nozzles is supplied with more fuel than the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and
- one or more fuel-oil heat exchangers;
- the method comprising:
- providing a fuel to the one or more fuel-oil heat exchangers;
- transferring heat from oil to the fuel in the one or more fuel-oil heat exchangers; and
- providing the fuel from the one or more fuel-oil heat exchangers to the plurality of fuel spray nozzles; wherein heat is transferred from the oil to the fuel in the one or more fuel-oil heat exchangers to lower a viscosity of the fuel to 0.58 mm$^2$/s or lower on injection of the fuel into the combustion chamber at cruise conditions.

According to an eighth aspect, there is provided a gas turbine engine for an aircraft, comprising:
- a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which the first subset of fuel spray nozzles is supplied with more fuel than the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and
- a fuel distribution system configured to provide a fuel to the plurality of fuel spray nozzles, comprising one or more fuel-oil heat exchangers and a controller; wherein the controller is configured to control the one or more fuel-oil heat exchangers to transfer heat from oil to the fuel to lower a viscosity of the fuel to 0.58 mm$^2$/s or lower on injection of the fuel into the combustion chamber at cruise conditions.

The inventors have determined that the viscosity of a fuel is an important factor affecting how the fuel is delivered to a combustor, and ignited and combusted within the combustor. Viscosity may affect droplet size from fuel spray nozzles, which may in turn impact atomisation and burn efficiency. Taking the fuel viscosity into account when delivering fuel to the combustor, and controlling it as appropriate by varying heat input, may therefore provide more efficient fuel-burn, improving aircraft performance. A lower viscosity of the fuel at cruise conditions may lend itself to a more efficient engine.

According to a ninth aspect, there is provided a method of operating a gas turbine engine, the gas turbine engine comprising:
- a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which the first subset of fuel spray nozzles is supplied with more fuel than the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5;

the method comprising:

operating the gas turbine engine such that a reduction of 20-80% in an average of particles/kg of nvPM in the exhaust of the gas turbine engine when the engine is operating at 85% available thrust for given operating conditions and particles/kg of nvPM in the exhaust of the gas turbine engine when the engine is operating at 30% available thrust for the given operating conditions is obtained when a fuel provided to the plurality of fuel spray nozzles is a sustainable aviation fuel instead of a fossil-based hydrocarbon fuel.

As used herein, 'nvPM' refers to 'non-volatile particulate matter'.

According to a tenth aspect, there is provided a gas turbine engine for an aircraft, comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which the first subset of fuel spray nozzles is supplied with more fuel than the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and a controller; wherein the controller is configured to control operation of the gas turbine engine such that a reduction of 20-80% in an average of particles/kg of nvPM in the exhaust of the gas turbine engine when the engine is operating at 85% available thrust for given operating conditions and particles/kg of nvPM in the exhaust of the gas turbine engine when the engine is operating at 30% available thrust for the given operating conditions is obtained when a fuel provided to the plurality of fuel spray nozzles is a sustainable aviation fuel instead of a fossil-based hydrocarbon fuel.

A reduction in a concentration of nvPM in the exhaust of a gas turbine engine is advantageous as it contributes to reducing the total undesirable emissions of the engine. In addition, reducing nvPM reduces coking within the engine.

The inventors have determined that a number of parameters related to the operation of a gas turbine engine have an influence on or are an important factor in the configuration and arrangement of the combustor of the engine when certain types of fuel, such as a sustainable aviation fuel, is being burnt. The inventors have determined that any one or more of the parameters of the above aspects must be taken into account in determining combustor arrangement and operation for certain fuels to take into account how that fuel is distributed, ignited and burnt within the combustor.

Unless otherwise stated, all references to the "core size" herein are in units of $s \cdot K^{1/2} \cdot in$ and all references to the "number of fuel spray nozzles per unit engine core size" is the number of nozzles per unit engine core size also in $s \cdot K^{1/2} \cdot in$ In any of the third, fourth, fifth, sixth, seventh, eighth and/or ninth aspect, the method may comprise providing, or the fuel distribution system may be configured to provide, a fuel to the plurality of fuel spray nozzles having a calorific value of at least 43.5 MJ/kg. In the tenth aspect, the fuel may have a calorific value of at least 43.5 MJ/kg. In any aspect of the present disclosure, the fuel may have a calorific value of at least 43.8 MJ/kg. The calorific value may be between 43.5 MJ/kg and 44 MJ/kg. The calorific value may be 43.5, 43.6, 43.7, 43.8 43.9 or 44.0 MJ/kg, or in any range defined between any two of those values.

In any of the first, second, third, fourth, fifth, sixth, seventh, eighth and/or ninth aspects the density of the fuel may be 760-840 kg/m³ at 15° C.

In any of the first, second, ninth and/or tenth aspects, the gas turbine engine may further comprise one or more fuel-oil heat exchangers, or the fuel distribution system may comprise one or more fuel-oil heat exchangers and a controller.

In either the first and/or ninth aspects, the method may further comprise: providing a fuel to the one or more fuel-oil heat exchangers; transferring heat from oil to the fuel in the one or more fuel-oil heat exchangers; and providing the fuel from the one or more fuel-oil heat exchangers to the plurality of fuel spray nozzles.

In any of the first, second, fifth, sixth, seventh, eighth, ninth and/or tenth aspects, the method may comprise transferring heat from oil to the fuel in the one or more fuel-oil heat exchangers, or the controller may be configured to control the one or more fuel-oil heat exchangers, to raise a temperature of the fuel to an average of at least 135° C. on injection of the fuel into the combustion chamber at cruise conditions.

The features of the following statements may be used in combination with any of the first, second, third, fourth, fifth, sixth, seventh, eighth, ninth and/or tenth, aspects:

The method may comprise transferring heat from oil to the fuel in the one or more fuel-oil heat exchangers, or the controller may be configured to control the one or more fuel-oil heat exchangers, to raise a temperature of the fuel to an average of between 135° C. and 200° C. on injection of the fuel into the combustion chamber at cruise conditions.

The method may comprise transferring heat from oil to the fuel in the one or more fuel-oil heat exchangers, or the controller may be configured to control the one or more fuel-oil heat exchangers, to raise a temperature of the fuel to an average of between 145° C. and 180° C. on injection of the fuel into the combustion chamber at cruise conditions.

The method may comprise transferring heat from oil to the fuel in the one or more fuel-oil heat exchangers, or the controller may be configured to control the one or more fuel-oil heat exchangers, to raise a temperature of the fuel to an average of between 155° C. and 170° C. on injection of the fuel into the combustion chamber at cruise conditions.

The method may comprise transferring heat from oil to the fuel in the one or more fuel-oil heat exchangers, or the controller may be configured to control the one or more fuel-oil heat exchangers, to raise a temperature of the fuel to an average of 135° C., 140° C., 145° C., 150° C., 155° C., 160° C., 165° C., 170° C., 175° C., 180° C., 185° C., 190° C., 195° C., 200° C., or any range defined between any two of these values, on injection of the fuel into the combustion chamber at cruise conditions.

In any of the first, second, third, fourth, seventh, eighth, ninth and/or tenth, aspects, the method may comprise transferring, or the controller may be configured to control the one or more fuel-oil heat exchangers to transfer, 200-600 kW/m³ of heat from oil to the fuel in the one or more fuel-oil heat exchangers at cruise conditions before providing the fuel to the plurality of fuel spray nozzles.

The features of the following statements may be used in combination with any of the first, second, third, fourth, fifth, sixth, seventh, eighth, ninth and/or tenth, aspects:

The method may comprise transferring, or the controller may be configured to control the one or more fuel-oil heat exchangers to transfer, 250-550 kW/m³ of heat from oil to the fuel in the one or more fuel-oil heat exchangers at cruise conditions before providing the fuel to the plurality of fuel spray nozzles.

The method may comprise transferring, or the controller may be configured to control the one or more fuel-oil heat exchangers to transfer, 300-500 kW/m³ of heat from oil to the fuel in the one or more fuel-oil heat exchangers at cruise conditions before providing the fuel to the plurality of fuel spray nozzles.

The method may comprise transferring, or the controller may be configured to control the one or more fuel-oil heat exchangers to transfer, 350-450 kW/m³ of heat from oil to the fuel in the one or more fuel-oil heat exchangers at cruise conditions before providing the fuel to the plurality of fuel spray nozzles.

The method may comprise transferring, or the controller may be configured to control the one or more fuel-oil heat exchangers to transfer, 200 kW/m³, 225 kW/m³, 250 kW/m³, 275 kW/m³, 300 kW/m³, 325 kW/m³, 350 kW/m³, 375 kW/m³, 400 kW/m³, 425 kW/m³, 450 kW/m³, 475 kW/m³, 500 kW/m³, 525 kW/m³, 550 kW/m³, 575 kW/m³, 600 kW/m³ of heat, or any range defined between any two of these values, from oil to the fuel in the one or more fuel-oil heat exchangers at cruise conditions before providing the fuel to the plurality of fuel spray nozzles.

It will be appreciated that the heat transfer defined herein is noted per unit volume (m³) of fuel reaching the combustor so as to adjust for fuel flow rate and any recirculation as described herein unless otherwise stated. The amount of heat transferred to the fuel may therefore be calculated based on a temperature of fuel on approach or entry to the combustor as compared to a temperature of fuel in a fuel tank of the aircraft.

In any of the first, second, third, fourth, fifth, sixth, ninth and/or tenth, aspects, the method may comprise transferring, or the controller may be configured to control the one or more fuel-oil heat exchangers to transfer, heat from oil to the fuel in the one or more fuel-oil heat exchangers, to lower a viscosity of the fuel to 0.58 mm²/s or lower on injection of the fuel into the combustion chamber at cruise conditions.

The features of the following statements may be used in combination with any of the first, second, third, fourth, fifth, sixth, seventh, eighth, ninth and/or tenth, aspects:

The method may comprise transferring, or the controller may be configured to control the one or more fuel-oil heat exchangers to transfer, heat from oil to the fuel in the one or more fuel-oil heat exchangers to lower a viscosity of the fuel to between 0.58 mm²/s and 0.30 mm²/s on injection of the fuel into the combustion chamber at cruise conditions.

The method may comprise transferring, or the controller may be configured to control the one or more fuel-oil heat exchangers to transfer, heat from oil to the fuel in the one or more fuel-oil heat exchangers to lower a viscosity of the fuel to between 0.54 mm²/s and 0.34 mm²/s on injection of the fuel into the combustion chamber at cruise conditions.

The method may comprise transferring, or the controller may be configured to control the one or more fuel-oil heat exchangers to transfer, heat from oil to the fuel in the one or more fuel-oil heat exchangers to lower a viscosity of the fuel to between 0.50 mm²/s and 0.38 mm²/s on injection of the fuel into the combustion chamber at cruise conditions.

The method may comprise transferring, or the controller may be configured to control the one or more fuel-oil heat exchangers to transfer, heat from oil to the fuel in the one or more fuel-oil heat exchangers to lower a viscosity of the fuel to 0.58, 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31 or 0.30 mm²/s, or any range defined between any two of these values, on injection of the fuel into the combustion chamber at cruise conditions.

In any of the first, second, third, fourth, fifth, sixth, seventh and/or eighth, aspects, the method may comprise operating the gas turbine engine, or the controller may be configured to control operation of the gas turbine engine, such that a reduction of 20-80% in an average of particles/kg of nvPM in the exhaust of the gas turbine engine when the engine is operating at 85% available thrust for given operating conditions and particles/kg of nvPM in the exhaust of the gas turbine engine when the engine is operating at 30% available thrust for the given operating conditions is obtained when a fuel provided to the plurality of fuel spray nozzles is a sustainable aviation fuel instead of a fossil-based hydrocarbon fuel.

The features of the following statements may be used in combination with any of the first, second, third, fourth, fifth, sixth, seventh, eighth, ninth and/or tenth, aspects:

The method may comprise operating the gas turbine engine, or the controller may be configured to control operation of the gas turbine engine, such that a reduction of 25-75% in an average of particles/kg of nvPM in the exhaust of the gas turbine engine when the engine is operating at 85% available thrust for given operating conditions and particles/kg of nvPM in the exhaust of the gas turbine engine when the engine is operating at 30% available thrust for the given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of 30-70% in an average of particles/kg of nvPM in the exhaust of the gas turbine engine when the engine is operating at 85% available thrust for given operating conditions and particles/kg of nvPM in the exhaust of the gas turbine engine when the engine is operating at 30% available thrust for the given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of 20-50% in an average of particles/kg of nvPM in the exhaust of the gas turbine engine when the engine is operating at 85% available thrust for given operating conditions and particles/kg of nvPM in the exhaust of the gas turbine engine when the engine is operating at 30% available thrust for the given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of 40-60% in an average of particles/kg of nvPM in the exhaust of the gas turbine engine when the engine is operating at 85% available thrust for given operating conditions and particles/kg of nvPM in the exhaust of the gas turbine engine when the engine is operating at 30% available thrust for the given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of 20%, 25%, 30%, 35%, 40%, 45%, 50%, 55%, 60%, 65%, 70%, 75%, or 80%, or any range defined between any two of these values, in an average of particles/kg of nvPM in the exhaust of the gas turbine engine when the engine is operating at 85% available thrust for given operating conditions and particles/kg of nvPM in the exhaust of the gas turbine engine when the engine is operating at 30% available thrust for the given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of 20%, 22%, 24%, 26%, 28%, 30%, 32%, 34%, 36%, 38%, 40%, 42%, 44%, 46%, 48%, or 50%, or any range defined between any two of these values, in an average of particles/kg of nvPM in the exhaust of the gas turbine engine when the engine is operating at 85% available thrust for given operating conditions and particles/kg of nvPM in the exhaust of the gas turbine engine when the engine is operating at 30% available thrust for the given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of 40%, 41%, 42%, 43%, 44%, 45%, 46%, 47%, 48%, 49%, 50%, 51%, 52%, 53%, 54%, 55%, 56%, 57%, 58%, 59%, or 60%, or any range defined between any two of these values, in an average of particles/kg of nvPM in the exhaust of the gas turbine engine when the engine is operating at 85% available thrust for given operating conditions and particles/kg of nvPM in the exhaust of the gas turbine engine when the engine is operating at 30% available thrust for the given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of 9-18% in an average of particles/kg of nvPM in the exhaust of the gas turbine engine when the engine is operating at 100% available thrust for given operating conditions and particles/kg of nvPM in the exhaust of the gas turbine engine when the engine is operating at 85% available thrust for the given operating conditions is obtained when the fuel of the air-fuel mixture is a sustainable aviation fuel instead of a fossil-based hydrocarbon fuel. This reduction may be obtained when a lean air-fuel mixture is provided to the combustion chamber. In some examples, the lean air-fuel mixture may have an air-fuel ratio of greater than around 15.

The method may comprise operating the gas turbine engine, or the controller may be configured to control operation of the gas turbine engine, such that a reduction of 10-17% in an average of particles/kg of nvPM in the exhaust of the gas turbine engine when the engine is operating at 100% available thrust for given operating conditions and particles/kg of nvPM in the exhaust of the gas turbine engine when the engine is operating at 85% available thrust for the given operating conditions is obtained when the fuel of the air-fuel mixture is a sustainable aviation fuel instead of a fossil-based hydrocarbon fuel. This reduction may be obtained when a lean air-fuel mixture is provided to the combustion chamber. In some examples, the lean air-fuel mixture may have an air-fuel ratio of greater than around 15.

The method may comprise operating the gas turbine engine, or the controller may be configured to control operation of the gas turbine engine, such that a reduction of 11-16% in an average of particles/kg of nvPM in the exhaust of the gas turbine engine when the engine is operating at 100% available thrust for given operating conditions and particles/kg of nvPM in the exhaust of the gas turbine engine when the engine is operating at 85% available thrust for the given operating conditions is obtained when the fuel of the air-fuel mixture is a sustainable aviation fuel instead of a fossil-based hydrocarbon fuel. This reduction may be obtained when a lean air-fuel mixture is provided to the combustion chamber. In some examples, the lean air-fuel mixture may have an air-fuel ratio of greater than around 15.

The method may comprise operating the gas turbine engine, or the controller may be configured to control operation of the gas turbine engine, such that a reduction of 12-15% in an average of particles/kg of nvPM in the exhaust of the gas turbine engine when the engine is operating at 100% available thrust for given operating conditions and particles/kg of nvPM in the exhaust of the gas turbine engine when the engine is operating at 85% available thrust for the given operating conditions is obtained when an a lean air-fuel mixture is provided to the combustion chamber and when the fuel of the air-fuel mixture is a sustainable aviation fuel instead of a fossil-based hydrocarbon fuel. This reduction may be obtained when a lean air-fuel mixture is provided to the combustion chamber. In some examples, the lean air-fuel mixture may have an air-fuel ratio of greater than around 15.

The method may comprise operating the gas turbine engine, or the controller may be configured to control operation of the gas turbine engine, such that a reduction of 9%, 10%, 11%, 12%, 13%, 14%, 15%, 16%, 17%, or 18%, or any range defined between any two of these values, in an average of particles/kg of nvPM in the exhaust of the gas turbine engine when the engine is operating at 100% available thrust for given operating conditions and particles/kg of nvPM in the exhaust of the gas turbine engine when the engine is operating at 85% available thrust for the given operating conditions is obtained when the fuel of the air-fuel mixture is a sustainable aviation fuel instead of a fossil-based hydrocarbon fuel. This reduction may be obtained when a lean air-fuel mixture is provided to the combustion chamber. In some examples, the lean air-fuel mixture may have an air-fuel ratio of greater than around 15.

The method may comprise operating the gas turbine engine, or the controller may be configured to control operation of the gas turbine engine, such that a reduction of 12.0%, 12.1%, 12.2%, 12.3%, 12.4%, 12.5%, 12.6%, 12.7%, 12.8%, 12.9%, 13.0%, 13.1%, 13.2%, 13.3%, 13.4%, 13.5%, 13.6%, 13.7%, 13.8%, 13.9%, 14.0%, 14.1%, 14.2%, 14.3%, 14.4%, 14.5%, 14.6%, 14.7%, 14.8%, 14.9%, or 15.0%, or any range defined between any two of these values, in an average of particles/kg of nvPM in the exhaust of the gas turbine engine when the engine is operating at 100% available thrust for given operating conditions and particles/kg of nvPM in the exhaust of the gas turbine engine when the engine is operating at 85% available thrust for the given operating conditions is obtained when the fuel of the air-fuel mixture is a sustainable aviation fuel instead of a fossil-based hydrocarbon fuel. This reduction may be obtained when a lean air-fuel mixture is provided to the combustion chamber. In some examples, the lean air-fuel mixture may have an air-fuel ratio of greater than around 15.

The method may comprise operating the gas turbine engine, or the controller may be configured to control operation of the gas turbine engine, such that a reduction of 55-80% in particles/kg of nvPM in the exhaust of the gas turbine engine when the engine is operating at 7% available thrust for given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of 60-75% in particles/kg of nvPM in the exhaust of the gas turbine engine when the engine is operating at 7% available thrust for given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of 65-70% in particles/kg of nvPM in the exhaust of the gas turbine engine when the engine is operating at 7% available thrust for given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of around 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, or 80%, or any range defined between any two of these values, in particles/kg of nvPM in the exhaust of the gas turbine engine when the engine is operating at 7% available thrust for given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of around 66.0%, 66.1%, 66.2%, 66.3%, 66.4%, 66.5%, 66.6%, 66.7%, 66.8%, 66.9%, 67.0%, 67.1%, 67.2%, 67.3%, 67.4%, 67.5%, 67.6%, 67.7%, 67.8%, 67.9%, or 68.0%, or any range defined between any two of these values, in particles/kg of nvPM in the exhaust of the gas turbine engine when the engine is operating at 7% available thrust for given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of 2-15% in particles/kg of nvPM in the exhaust of the gas turbine engine when the engine is operating at 100% available thrust for given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of 4-12% in particles/kg of nvPM in the exhaust of the gas turbine engine when the engine is operating at 100% available thrust for given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of 5-10% in particles/kg of nvPM in the exhaust of the gas turbine engine when the engine is operating at 100% available thrust for given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of around 2%, 3%, 4%, 5%, 6%, 7%, 8%, 9%, 10%, 11%, 12%, 13%, 14%, or 15%, or any range defined between any two of these values, in particles/kg of nvPM in the exhaust of the gas turbine engine when the engine is operating at 100% available thrust for given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a reduction of around 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, or 9.0%, or any range defined between any two of these values, in particles/kg of nvPM in the exhaust of the gas turbine engine when the engine is operating at 100% available thrust for given operating conditions is obtained when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of particles/kg of nvPM in the exhaust of the gas turbine engine when the engine is operating at 7% available thrust for given operating conditions to an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions is in the range of 1:1 to 130:1 when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of particles/kg of nvPM in the exhaust of the gas turbine engine when the engine is operating at 7% available thrust for given operating conditions to an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions is in the range of 10:1 to 120:1 when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of particles/kg of nvPM in the exhaust of the gas turbine engine when the engine is operating at 7% available thrust for given operating conditions to an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions is in the range of 20:1 to 110:1 when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of particles/kg of nvPM in the exhaust of the gas turbine engine when the engine is operating at 7% available thrust for given operating conditions to an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions is in the range of 30:1 to 100:1 when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of particles/kg of nvPM in the exhaust of the gas turbine engine when the engine is operating at 7% available thrust for given operating conditions to an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions is around 1:1, 10:1, 20:1, 30:1, 40:1, 50:1, 60:1, 70:1, 80:1, 90:1, 100:1, 110:1, 120:1, or 130:1, or any range defined between any two of these values, when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of particles/kg of nvPM in the exhaust of the gas turbine engine when the engine is operating at 7% available thrust for given operating conditions to an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions is around 30:1, 35:1, 40:1, 45:1, 50:1, 55:1, 60:1, 65:1, 70:1, 75:1, 80:1, 85:1, 90:1, 95:1, or 100:1, or any range defined between any two of these values, when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of particles/kg of nvPM in the exhaust of the gas turbine engine when the engine is operating at 7% available thrust for given operating conditions to an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions is in the range of 500:1 to 7000:1 when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of particles/kg of nvPM in the exhaust of the gas turbine engine when the engine is operating at 7% available thrust for given operating conditions to an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions is in the range of 1000:1 to 6500:1 when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of particles/kg of nvPM in the exhaust of the gas turbine engine when the engine is operating at 7% available thrust for given operating conditions to an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions is in the range of 1500:1 to 6000:1 when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of particles/kg of nvPM in the exhaust of the gas turbine engine when the engine is operating at 7% available thrust for given operating conditions to an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions is in the range of 2000:1 to 5500:1 when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of particles/kg of nvPM in the exhaust of the gas turbine engine when the engine is operating at 7% available thrust for given operating conditions to an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions is around 500:1, 1000:1, 1500:1, 2000:1, 2500:1, 3000:1, 3500:1, 4000:1, 4500:1, 5000:1, 5500:1, 6000:1, 6500:1, or 7000:1, or any range defined between any two of these values, when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of particles/kg of nvPM in the exhaust of the gas turbine engine when the engine is operating at 7% available thrust for given operating conditions to an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions is around 2000:1, 2250:1, 2500:1, 2750:1, 3000:1, 3250:1, 3500:1, 3750:1, 4000:1, 4250:1, 4500:1, 4750:1, 5000:1, 5250:1, or 5500:1, or any range defined between any two of these values, when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions to particles/kg of nvPM in the exhaust of the gas turbine engine when the engine is operating at 100% available thrust for the given operating conditions is in the range of 0.4:1 to 1.3:1 when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions to particles/kg of nvPM in the exhaust of the gas turbine engine when the engine is operating at 100% available thrust for the given operating conditions is in the range of 0.5:1 to 1.2:1 when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions to particles/kg of nvPM in the exhaust of the gas turbine engine when the engine is operating at 100% available thrust for the given operating conditions is in the range of 0.6:1 to 1.1:1 when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions to particles/kg of nvPM in the exhaust of the gas turbine engine when the engine is operating at 100% available thrust for the given operating conditions is in the range of 0.7:1 to 1:1 when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio of an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions to particles/kg of nvPM in the exhaust of the gas turbine engine when the engine is operating at 100% available thrust for the given operating conditions is around 0.4:1, 0.5:1, 0.6:1, 0.7:1, 0.8:1, 0.9:1, or 1:1, or any range defined between any two of these values, when a fuel provided to the plurality of fuel spray nozzles is a sustainable aviation fuel instead of a fossil-based hydrocarbon fuel.

The method may comprise operating the gas turbine engine, or the controller may be configured to control operation of the gas turbine engine, such that a ratio an average of particles/kg of nvPM in the exhaust of the gas turbine engine when the engine is operating at 100% available thrust for the given operating conditions and particles/kg of nvPM in the exhaust of the gas turbine engine when the engine is operating at 85% available thrust for the given operating conditions to particles/kg of nvPM in the exhaust of the gas turbine engine when the engine is operating at 100% available thrust for the given operating conditions is around 0.60:1, 0.65:1, 0.70:1, 0.75:1, 0.80:1, 0.85:1, 0.90:1, 0.95:1, or 1.00:1, or any range defined between any two of these values, when a fuel provided to the plurality of fuel spray nozzles is a sustainable aviation fuel instead of a fossil-based hydrocarbon fuel.

The following statements may apply to any one or more of the aspects defined above, or anywhere else herein.

In any aspect of the present disclosure, the ratio of the number of fuel spray nozzles in the first subset of fuel spray nozzles to the number of fuel spray nozzles in the second subset of fuel spray nozzles may be in the range of 1:3 to 1:4.

In any aspect of the present disclosure, the ratio of the number of fuel spray nozzles in the first subset of fuel spray nozzles to the number of fuel spray nozzles in the second subset of fuel spray nozzles may be in the range of 1:3.5 to 1:4.

In any aspect of the present disclosure, the first subset of fuel spray nozzles may include between 1 and 10 fuel spray nozzles, and more preferably between 3 and 5 fuel spray nozzles.

In any aspect of the present disclosure, the second subset of fuel spray nozzles may include between 10 and 25 fuel spray nozzles, and more preferably between 13 and 20, and yet more preferably between 13 and 17.

In any aspect of the present disclosure, the total number of fuel spray nozzles may be 8, 9, 10, 11, 12, 13, 14, 15, 16, 17, 18, 19, 20, 21, 22, 23, 24, 25, 26, 27, 28, 29, or 30, or any inclusive range defined between any two of those values, the two values forming the upper and lower bounds of the range and being included in the range.

In any aspect of the present disclosure, the first subset of fuel spray nozzles may include 1, 2, 3, 4, 5, 6, 7, 8, 9, 10, or any range defined between any two of those values.

In any aspect of the present disclosure, the second subset of fuel spray nozzles may include 10, 11, 12, 13, 14, 15, 16, 17, 18, 19, 20, 21, 22, 23, 24, 25, or any range defined between any two of those values.

In any aspect of the present disclosure, the combustor may comprise one or more ignitors. The combustor may comprise any suitable number of ignitors, for example, 1, 2, 3, 4, 5, 6, 7, 8, 9, 10 and so on, or any inclusive range defined between any two of the values in this sentence, the two values forming the upper and lower bounds of the range and being included in the range.

Each of the first subset of fuel spray nozzles may be located nearer a respective one or more of the ignitors than the second subset.

One or more of the ignitors may be arranged diametrically opposite another one or more of the ignitors.

In any aspect of the present disclosure, the fuel provided to the plurality of fuel spray nozzles may comprise a sustainable aviation fuel, for example having a % SAF in the range of 10-50%, or 50-100%, or which may be 100% SAF.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propellor stages may be driven by a gearbox. The gearbox may be of the type described herein.

An engine according to the present disclosure may be a turbofan engine. Such an engine may be a direct-drive turbofan engine in which the fan is directly connected to the fan drive turbine, for example without a gearbox, via a core shaft. In such a direct-drive turbofan engine, the fan may be said to rotate at the same rotational speed as the fan-drive turbine. Purely by way of example, the fan-drive turbine may be a first turbine, the core shaft may be a first core shaft, and the gas turbine engine may further comprise a second turbine and a second core shaft connecting the second turbine to the compressor. The second turbine, the compressor, and second core shaft may be arranged to rotate at a higher rotational speed than the first core shaft. In such an arrangement, the second turbine may be positioned axially upstream of the first turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is driven by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes, or vice versa, as required. The row of rotor blades and stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, or 250 cm to 280 cm, or 320 cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2600 rpm, or less than 2500 rpm, or less than 2300 rpm. Purely by way of further non-limitative example, the rotational speed of the fan at cruise conditions for a "geared" gas turbine engine having a fan diameter in the range of from 200 cm to 210 cm may be in the range of from 2750 to 2900 rpm. Purely by way of further non-limitative example, the rotational speed of the fan at cruise conditions for a "geared" gas turbine engine having a fan diameter in the range of from 210 cm to 230 cm may be in the range of from 2500 to 2800 rpm. Purely by way of further non-limitative example, the rotational speed of the fan at cruise conditions for a "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio (BPR), where the bypass ratio is defined as the ratio of the mass flow rate of the flow through the bypass duct to the mass flow rate of the flow through the core. In some arrangements the bypass ratio at cruise conditions may be greater than (or on the order of) any of the following: 9, 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio at cruise conditions of a direct-drive gas turbine engine according to the present disclosure may be in the range of from 9:1 to 11:1. Purely by way of further non-limitative example, the bypass ratio at cruise conditions of a geared gas turbine engine according to the present disclosure may be in the range of from 12:1 to 15:1. The bypass duct may be substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 45. Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 360 cm may be in the range of from 50 to 60. Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 95 $Nkg^{-1}s$. Purely by way of non-limitative example, the specific thrust of a geared gas turbine engine having a fan diameter in the range of from 210 cm to 230 cm may be in the range of from 80 $Nkg^{-1}s$ to 90 $Nkg^{-1}s$. Purely by way of non-limitative example, the specific thrust of a geared gas turbine engine having a fan diameter in the range of from 340 cm to 360 cm may be in the range of from 70 $Nkg^{-1}s$ to 90 $Nkg^{-1}s$. Purely by way of non-limitative example, the specific thrust of a direct drive gas turbine engine having a fan diameter in the range of from 300 cm to 340 cm may be in the range of from 90 $Nkg^{-1}s$ to 120 $Nkg^{-1}s$.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 kN, 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise conditions, the TET may be at least (or on the order of) any of the following: 1400K, 1450K, 1500K, 1550K, 1600K or 1650K. Thus, purely by way of non-limitative example, the TET at cruise conditions of a geared gas turbine engine having a fan diameter in the range of from 200 cm to 210 cm may be in the range of from 1540K to 1600K. Purely by way of non-limitative example, the TET at cruise conditions of a geared gas turbine engine having a fan diameter in the range of from 210 cm to 230 cm may be in the range of from 1590K to 1650K. Purely by way of non-limitative example, the TET at cruise conditions of a geared gas turbine engine having a fan diameter in the range of from 340 cm to 360 cm may be in the range of from 1600K to 1660K. Purely by way of non-limitative example, the TET at cruise conditions of a direct drive gas turbine engine having a fan diameter in the range of from 300 cm to 340 cm may be in the range of from 1590K to 1650K. Purely by way of non-limitative example, the TET at cruise conditions of a direct drive gas turbine engine having a fan diameter in the range of from 300 cm to 340 cm may be in the range of from 1570K to 1630K.

The TET at cruise conditions may be in an inclusive range bounded by any two of the values in the previous sentence (i.e. the values may form upper or lower bounds), for example 1530K to 1600K. The maximum TET in use of the engine may be, for example, at least (or on the order of) any of the following: 1700K, 1750K, 1800K, 1850K, 1900K, 1950K, 2000K, 2050K, or 2100K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may be in an inclusive range bounded by any two of the values in the previous sentence (i.e. the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing have the conventional meaning and would be readily understood by the skilled person. Thus, for a given gas turbine engine for an aircraft, the skilled person would immediately recognise each term to refer to an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions. Additionally or alternatively, climb may refer to a nominal point in an aircraft flight cycle between take-off and landing, where a relative increase in altitude is required, which may require an additional thrust demand of the engine.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft. During either or both of descent and approach, the engine may be producing between 20% and 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied mutatis mutandis to any other aspect. Furthermore, except where mutually exclusive, any feature or parameter described herein may be applied to any aspect and/or combined with any other feature or parameter described herein.

As used herein, a range "from value X to value Y" or "between value X and value Y", or the likes, denotes an inclusive range; including the bounding values of X and Y.

BRIEF DESCRIPTION OF THE DRAWINGS

Embodiments will now be described by way of example only, with reference to the Figures, in which.

DETAILED DESCRIPTION OF THE DISCLOSURE

Figure 1:
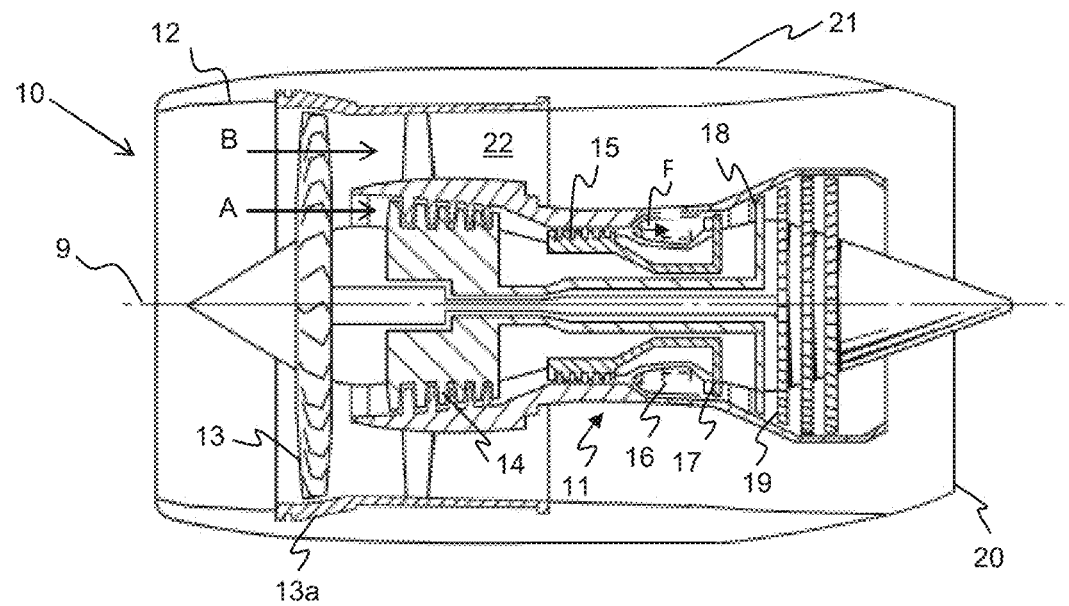
FIG. 1 is a sectional side view of a gas turbine engine.

With reference to FIG. 1, a gas turbine engine is generally indicated at 10, having a principal rotational axis 9. The engine 10 comprises, in axial flow series, an air intake 12, a propulsive fan 13, an intermediate pressure compressor 14, a high pressure compressor 15, combustion equipment 16, a high pressure turbine 17, an intermediate pressure turbine 18, a low-pressure turbine 19 and an exhaust nozzle 20. A nacelle 21 surrounds the engine 10 and defines both the intake 12 and the exhaust nozzle 20.

In use, air entering the intake 12 is accelerated by the fan 13 to produce two air flows: a core airflow A and a bypass airflow B. The gas turbine engine comprises a core 11 which receives the core airflow A. The core airflow A flows into the intermediate pressure compressor 14, and the bypass air flow B passes through a bypass duct 22 to provide propulsive thrust. The intermediate pressure compressor 14 compresses the airflow A before delivering that air to the high pressure compressor 15 where further compression takes place. The gas turbine engine comprises a fan case 13a in which the fan 13 is mounted, an inner surface of which defines part of the bypass duct 22.

The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high, intermediate, and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by a suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines.

Note that the terms "low pressure turbine" and "low pressure compressor" as used herein may be taken to mean the lowest pressure turbine stages and lowest pressure compressor stages (i.e. not including the fan 13) respectively and/or the turbine and compressor stages that are connected together by the interconnecting shaft with the lowest rotational speed in the engine. In some literature, the "low pressure turbine" and "low pressure compressor" referred to herein may alternatively be known as the "intermediate pressure turbine" and "intermediate pressure compressor". Where such alternative nomenclature is used, the fan 13 may be referred to as a first, or lowest pressure, compression stage.

Further the engine may comprise a gearbox provided in the drive train from a turbine to a compressor and/or fan. Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 may have a split flow nozzle meaning that the flow through the bypass duct 22 has its own nozzle that is separate to and radially outside the core engine nozzle. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle (as shown in FIG. 1). One or both nozzles (whether mixed or split flow) may have a fixed or variable area.

Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

Functional performance of a given composition, or blend of fuel for use in a given mission, may be defined, at least in part, by the ability of the fuel to service the Brayton cycle of the gas turbine engine 10. Parameters defining functional performance may include, for example, specific energy; energy density; thermal stability; and, emissions including particulate matter. A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (° C.) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use. For example, some approved blends comprise blend ratios of up to 10% sustainable aviation fuel, whilst other approved blends comprise blend ratios of between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cycloalkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. Thus, in some examples, sustainable aviation fuels may comprise either or both of a density of between 90% and 98% that of kerosene and a calorific value of between 101% and 105% that of kerosene.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 2:
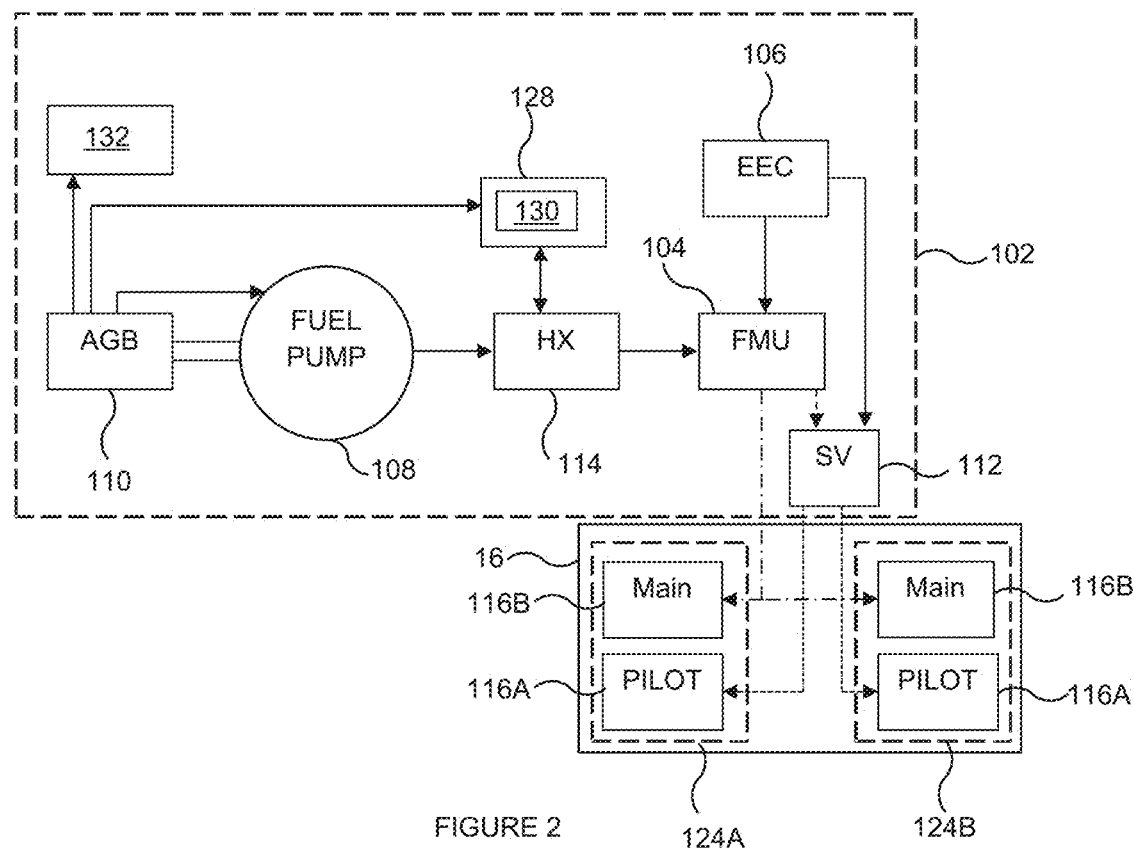
FIG. 2 is a schematic representation of a fuel distribution system and the combustor of a gas turbine engine.

FIG. 2 shows a schematic representation of a fuel distribution system 102 and the combustor 16 of the gas turbine engine 10. The combustor 16 is configured to utilise staged lean-burn combustion. Fuel is divided amongst pilot fuel injectors and main fuel injectors by means of a fuel system controller, which in the example shown is provided by a fuel metering unit (FMU) 104 under control of an electronic engine controller (EEC) 106. Fuel is delivered to the fuel metering unit 104 by a fuel pump 108. In the example shown, the fuel pump 108 is mechanically driven by an accessory gearbox (AGB) 110, although the fuel pump 108 may alternatively be electrically driven. The fuel pump 108 shown in FIG. 2 may be one of multiple fuel pumps provided within the fuel distribution system 102. For example, the fuel pump 108 may be a high pressure fuel pump provided on the gas turbine engine 10, with one or more additional lower pressure fuel pumps also being provided, optionally onboard the aircraft rather than forming part of the gas turbine engine 10.

High pressure fuel is delivered by the fuel metering unit 104 into one or more fuel manifolds for distribution to pilot fuel injectors 116A and main fuel injectors 116B. Delivery of fuel via the pilot fuel injectors 116A and main fuel injectors 116B is staged, thus at low powers (and hence low air mass flows) fuel is primarily or wholly delivered by the pilot fuel injectors 116A at a rich fuel-air ratio (i.e. at an equivalence ratio greater than unity) for improved flame stability. As power and mass flow increases, a staging point is reached at which fuel is delivered by some or all of the main fuel injectors 116B, supplementing the fuel flow from the pilot fuel injectors 116A. The main fuel injectors 116B are configured to inject fuel at a lean fuel-air ratio (i.e. at an equivalence ratio less than unity). At this point, air flow is such that the equivalence ratio immediately downstream of the pilot fuel injectors 116A is also fuel-lean. In the example shown, at higher power levels, fuel is injected by all main fuel injectors 116B.

Those skilled in the art will be familiar with such operation of staged combustion systems in order to effect lean burn at high powers whilst also observing flammability limits at lower powers.

The balance of injection of fuel by the pilot fuel injectors 116A and the main fuel injectors 116B is controlled by the electronic engine controller 106, which provides control signals to the fuel metering unit 104. The control signals may be directly or indirectly indicative of the total fuel that must be injected, for example in the form of a fuel flow rate and the ratio of pilot fuel injector fuel flow to main injector fuel flow.

Figure 3:
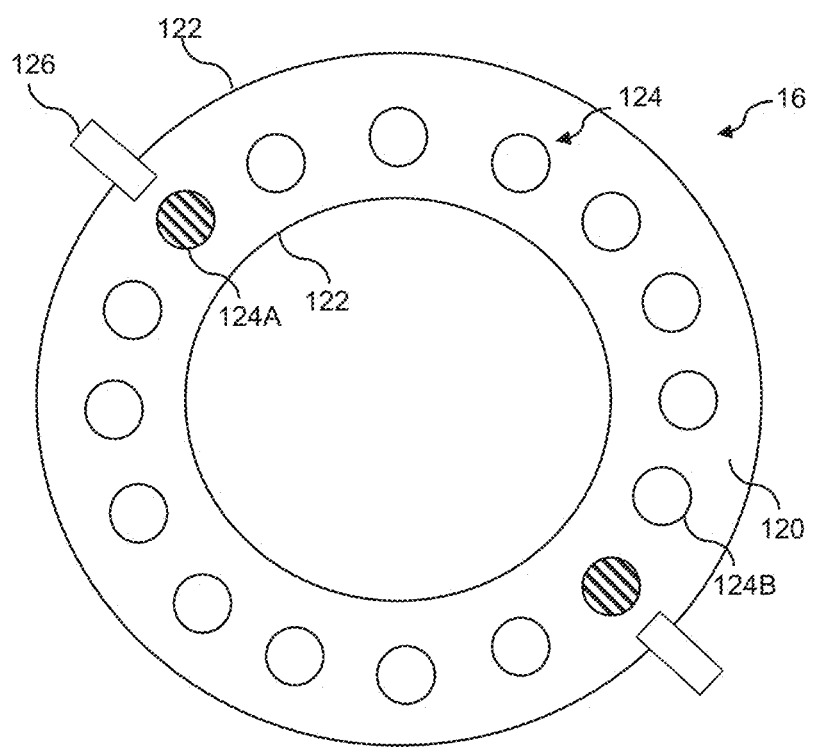
FIG. 3 is a cross-sectional view through the combustor of a gas turbine engine along the principal rotational axis of the engine.

FIG. 3 shows a section through the combustor 16 in a plane normal to the principal rotational axis 9 of the engine 10. The combustor 16 comprises an annular combustion chamber 120, defined by a liner 122. Other combustor configurations may alternatively be used, for example cannular combustors, canned combustors, etc.

The combustor 16 comprises a plurality of fuel spray nozzles 124 arranged about a circumference of the combustor 16 and configured to inject fuel into the combustion chamber 120. In the example shown, the combustor 16 comprises sixteen (16) fuel spray nozzles 124. The combustor 16 may alternatively comprise any suitable number of fuel spray nozzles, for example, 8, 9, 10, 11, 12, 13, 14, 15, 17, 18, 19, 20, 21, 22, 23, 24, 25, 26, 27, 28, 29, 30 fuel spray nozzles, and so on. The combustor may comprise a number of fuel spray nozzles in an inclusive range defined between any two of the values in the previous sentence, the two values forming the upper and lower bounds of the range and being included in the range. For example, the combustor may comprise between 14 and 27 fuel spray nozzles, or between 16 and 25 fuel spray nozzles or between 18 and 23 fuel spray nozzles.

A core size of a gas turbine engine may be defined as (with reference to the arrangement shown in FIG. 1):

$$\text{core size} = \dot{m}_2 \cdot \frac{\sqrt{T_3}}{P_3}$$

where $\dot{m}_2$ is the mass flow rate, in lbs per second, of air on entry to the high pressure compressor 15, $T_3$ is the temperature, in Kelvin, of air on exit from the high pressure compressor 15, and $P_3$ is the pressure, in lb inches per second squared per inch squared, of air on exit from the high pressure compressor 15. A unit of core size is therefore expressed as:

$$s \cdot K^{\frac{1}{2}} \cdot \text{in}$$

The core size (in $s \cdot K^{1/2} \cdot \text{in}$) of the engine may be between 4 and 7, for example 4, 4.5, 5, 5.5, 6, 6.5, or 7, or any range defined between any two of these values. In some examples, the engine core size (in $s \cdot K^{1/2} \cdot \text{in}$) may be in the range of 5.0, 5.1, 5.2, 5.3, 5.4, 5.5, 5.6, 5.6, 5.7, 5.8, 5.9, or 6, or any range defined between any two of these values. In yet further examples, the engine core size (in $s \cdot K^{1/2} \cdot \text{in}$) may be in the range of 5.25, 5.26, 5.27, 5.28, 5.29, 5.30, 5.31, 5.32, 5.33, 5.34, 5.35, 5.36, 5.37, 5.38, 5.39, 5.40, 5.41, 5.42, 5.43, 5.44, or 5.45, or any range defined between any two of these values.

A number of fuel spray nozzles 124 per unit engine core size (1 $s \cdot K^{1/2} \cdot \text{in}$) may be between 2 and 6. The number may be, for example 2, 3, 4, 5, or 6, or any range defined between any two of those values. In some examples, the number may be between 3 and 4, for example 3.0, 3.1, 3.2, 3.3, 3.4, 3.5, 3.6, 3.7, 3.8, 3.9, or 4.0, or any range defined between any two of these values.

The number of fuel spray nozzles per unit engine core size may be between 2 and 7, or more preferable between 2.1 and 6.5, or more preferably between 2.4 and 3.4.

In yet further examples, the number of fuel spray nozzles per unit engine core size may be 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, or within a range defined between any two of those values.

The core size is defined herein at an engine operation condition corresponding to a maximum value of the semi-non-dimensional flow at high pressure compressor entry, defined as:

$$\dot{m}_2 \frac{\sqrt{T_2}}{P_2}$$

where $\dot{m}_2$ is the mass flow rate (in lbs per second) of air on entry to the high pressure compressor, $T_2$ is the temperature (in Kelvin) of air on entry to the high pressure compressor, and $P_2$ is the pressure (in lb inches per second squared per inch squared) of air on entry to the high pressure compressor.

The operating condition corresponding to the maximum semi-non-dimensional flow at high pressure compressor entry may be the top of climb operating condition. The core size referred to herein may therefore be defined at the top of climb operating condition. The top of climb may be as defined in the art and as understood by the skilled person for a specific implementation of a gas turbine of the present application. In one specific example, the top of climb may correspond to operating at an altitude of between 30,000 ft to 39,000 ft (more specifically 35,000 ft), a forward speed of Mach Number 0.75 to 0.85, and ambient air temperature (DTAMB) of ISA+1 OK to ISA+15K.

In the example shown, each fuel spray nozzle 124 comprises a duplex fuel spray nozzle (also known as an internally-staged nozzle) in which a pilot fuel injector 116A is integrated in the same fuel spray nozzle 124 as a main fuel injector 116B. However, it is envisaged that other types of staged combustion configurations may be used, for example those with pilot fuel injectors and main fuel injectors in separate fuel spray nozzles rather than both contained in duplex or internally staged fuel spray nozzles. Indeed, it will be understood that the principles disclosed herein may be applied to any staged combustion system comprising pilot fuel injectors and main fuel injectors.

Returning to FIG. 2, the fuel distribution system 102 comprises a splitter valve (SV) 112 configured to split fuel flow between the fuel spray nozzles 124 of the combustor 16 such that pilot injectors 116A of a first subset 124A of the fuel spray nozzles 124 receive more fuel than pilot injectors 116A of a second subset 124B of the spray nozzles 124 below a staging point, for example up to a threshold fuel flow rate or engine power. Below the staging point, the pilot injectors of the second subset 124B may receive no fuel, or a lower amount of fuel compared to those of the first subset 124A. Above the staging point, all of the pilot injectors may receive the same amount of fuel. In the present example, the first and second subsets 124A, 124B of fuel spray nozzles include all fuel spray nozzles provided in the combustor as shown in FIG. 3. The electronic engine controller 106 is configured to control the splitter valve 112, although the splitter valve 112 may alternatively be mechanically controlled or have a fixed configuration. When referring to the amount of fuel provided to each fuel spray nozzle we mean the fuel flow rate provided to the nozzles at a given time.

In the example shown in FIG. 3, the first subset 124A of fuel spray nozzles 124 comprises 2 fuel spray nozzles 124 (shown in hatched lines). The first subset 124A of fuel spray nozzles 124 may alternatively comprise any suitable number of fuel spray nozzles 124, for example, 1, 3, 4, 5, 6, 7, 8, 9, 10 or more of the fuel spray nozzles 124, or a number within a range defined between any two of those values. For example, the first subset 124A of fuel spray nozzles may comprise between 2 and 6 fuel spray nozzles. The second subset 124B of fuel spray nozzles may comprise between 16 and 20 fuel spray nozzles, or between 13 and 17 fuel spray nozzles. Alternatively, the fuel distribution system 102 may not comprise a splitter valve, and the pilot injectors 116A of the fuel spray nozzles 124 may each receive substantially the same amount of fuel below a staging point.

In the example shown, the fuel spray nozzles 124 of the first subset 124A of fuel spray nozzles 124 are disposed within the combustor 16 such that they are located nearer one or more ignitors 126 of the combustor 16 than those of the second subset 124B of fuel spray nozzles 124. However, that is not essential, and the first subset 124A of fuel spray nozzles 124 may be disposed at any suitable location within the combustor 16. In the example shown, the combustor 16 comprises 2 ignitors arranged substantially diametrically opposite one another. However, the combustor 16 may comprise any suitable number of ignitors, for example, 1, 2, 3, 4, 5, 6, 7, 8, 9, 10, or any range defined between any two of those values, for example between 1 and 6, or between 2 and 6, or between 2 and 4. The one or more ignitors 126 may be disposed at any suitable location in the combustor 16 and need not be symmetrically arranged within the combustor 16.

Figure 4:
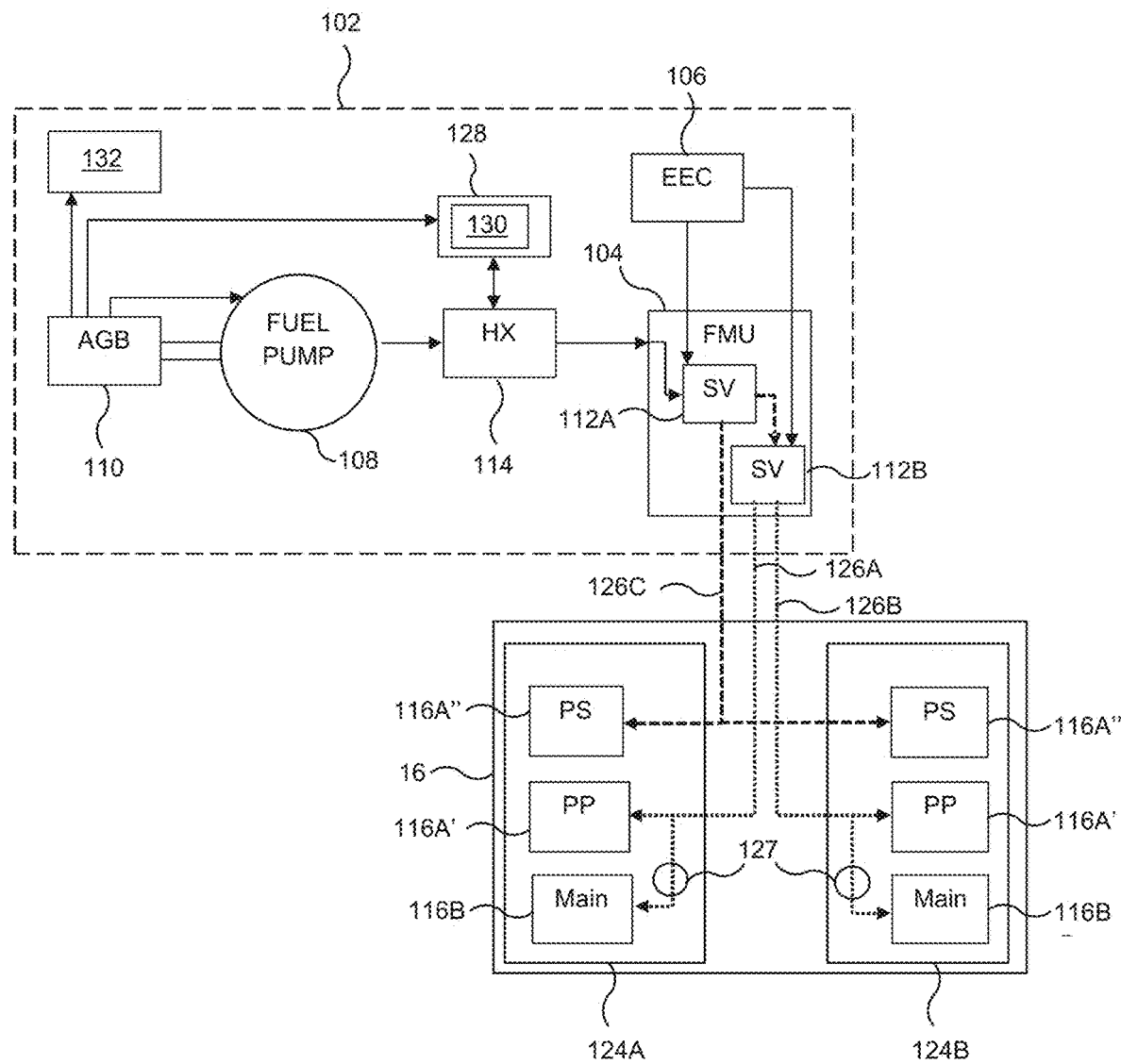
FIG. 4 is another schematic representation of a fuel distribution system and the combustor of a gas turbine engine.

Another example of the fuel distribution system 102 and combustor 16 is shown in FIG. 4. In this example, the combustor comprises a plurality of fuel spray nozzles which are divided into a first subset 124A and a second subset 124B similarly to as described above. Each fuel spray nozzle 124 comprises a primary pilot injector 116A', a secondary pilot injector 116A" and a main injector 116B. The primary pilot injectors 116A' and the main injectors 116B are supplied with fuel from the FMU 104 by a first and second pilot/main manifold 126A, 126B. The primary pilot injectors 116A' and the main injectors 116B of the first subset of nozzles 124A are supplied by the first pilot/main manifold 126A. The primary pilot injectors 116A' and the main injectors 116B of the second subset of nozzles 124B are supplied by the second pilot/main manifold 126B. The secondary pilot injectors 116A" are supplied with fuel from the FMU 104 by a secondary pilot manifold 126C. The first main/pilot manifold 126A is therefore connected between the FMU 104 and the fuel spray nozzles of the first subset 124A, while the second subset 124B are connected to the FMU 104 by the second main/pilot manifold 126B. All of the fuel spray nozzles (i.e. both subsets) are supplied with fuel by the secondary pilot manifold 126C.

The FMU 104 comprises a first splitter valve 112A and a second splitter valve 112B. The first splitter valve 112A is arranged to split fuel flow supplied to the FMU 104 into a first flow of fuel provided to the secondary pilot manifold 126C, and a second flow of fuel supplied to the second splitter valve 112B. The second splitter valve 112B is arranged to provide a flow of fuel to the primary pilot injectors 116A' such that the primary pilot injectors 116A' of the first subset 124A of nozzles receive more fuel below a staging point compared to those of the second subset 124B of fuel spray nozzles. Below the staging point, the splitter valve 112B is arranged to provide less fuel (including no fuel) to the second subset 124B of fuel spray nozzles. At or above the staging point, all of the nozzles of both first and second subsets may be provided with the same amount of fuel by the splitter valve 112B. As described above, the staging point may be a fuel flow threshold, or an engine power.

In the example shown in FIG. 4, staging of the main injectors is provided by passive valves 127 (or other types of valve) provided within each of the fuel spray nozzles 124. For example, each fuel spray nozzle 124 may comprise one or more passive valves arranged to control flow of fuel received from the respective main/pilot manifold 126A, 126B to allow staging between pilot only operation and pilot plus main operation. In other examples, other means for providing staging between pilot only and pilot plus main operation may be provided.

Although FIG. 4 shows a combustor having fuel spray nozzles comprising primary and secondary pilot injectors that may not be the case in other examples. The secondary pilot injectors may be absent in some examples, along with the secondary pilot manifold 126C and first splitter valve 112A.

Referring to the examples of both FIGS. 2 and 4, the fuel distribution system 102 comprises at least one fuel-oil heat exchanger (HX) 114. As is conventional, at least one substantially closed-loop oil system 128 is configured to supply lubricating oil to a plurality of engine components and collect the lubricating oil following lubrication of the engine components. The lubricating oil also acts to remove heat from those engine components, such that a temperature of the lubricating oil is increased following lubrication of the engine components. The fuel-oil heat exchanger 114 is configured to transfer heat from the heated lubricating oil to the fuel prior to the fuel entering the combustor 16. The transfer of heat from the heated lubricating oil to the fuel serves a number of purposes. One purpose is to reduce a temperature of the lubricating oil, such that the lubricating oil may be recirculated to remove heat from the engine components. Another purpose is to increase a temperature of the fuel prior to the fuel entering the combustor 16, in order to alter one or more properties of the fuel prior to entering the combustor 16 and improve or optimise combustion.

In the example shown, the fuel-oil heat exchanger 114 is disposed between the fuel pump 108 and the fuel metering unit 104, although the fuel-oil heat exchanger 114 may be disposed at any suitable location. The electronic engine controller 106 is configured to control operation of the fuel-oil heat exchanger 114, by providing control signals to the fuel-oil heat exchanger 114. The electronic engine controller 106 is configured to control operation of the fuel-oil heat exchanger 114 to adjust at least one property or parameter of the fuel on injection of the fuel into the combustion chamber 120. In the example shown, the electronic engine controller 106 is configured to control operation of the fuel-oil heat exchanger 114 to control at least one of a temperature and/or a viscosity of the fuel on injection of the fuel into the combustion chamber 120, and/or the amount of heat transferred to the fuel before it reaches the combustor 16.

In one example, the electronic engine controller 106 is configured to control operation of the fuel-oil heat exchanger 114 to raise the fuel temperature to an average of at least 135° C. on injection of the fuel into the combustion chamber 120 at cruise conditions. In other examples, the controller 106 is configured to control operation of the fuel-oil heat exchanger 106 to transfer heat from the oil to the fuel before the fuel is injected into the combustion chamber 120 so as to raise the fuel temperature, on injection of the fuel into the combustion chamber 120 at cruise conditions, to an average of between 135° C. and 170° C., or more preferably to an average of between 135° C. and 160° C., or even more preferably to an average of between 140° C. and 150° C.

Alternatively, the electronic engine controller 106 may be configured to control operation of the fuel-oil heat exchanger 114 to raise the fuel temperature to an average of at least 140° C., 145° C., 150° C., 155° C., 160° C., 165° C., 170° C., 175° C., 180° C., 185° C., 190° C., 195° C. or 200° C. on injection of the fuel into the combustion chamber 120 at cruise conditions.

The electronic engine controller 106 may alternatively be configured to control operation of the fuel-oil heat exchanger 114 to raise the fuel temperature on injection of the fuel into the combustion chamber 120 at cruise conditions to an average defined between any two of the following values: 135° C., 140° C., 145° C., 150° C., 155° C., 160° C., 165° C., 170° C., 175° C., 180° C., 185° C., 190° C., 195° C. or 200° C.

In another example, the electronic engine controller 106 is additionally or alternatively configured to control operation of the fuel-oil heat exchanger 114 to lower the fuel viscosity to 0.58 mm$^2$/s or lower on injection of the fuel into the combustion chamber 120 at cruise conditions. The controller 106 may be configured to control operation of the fuel-oil heat exchanger 114 to transfer heat from the oil to the fuel before the fuel is injected into the combustion chamber 120 so to lower the fuel viscosity to between 0.58 mm²/s and 0.30 mm²/s on injection of the fuel into the combustion chamber at cruise conditions or to between 0.50 mm²/s and 0.38 mm²/s on injection of the fuel into the combustion chamber at cruise conditions or to between 0.50 mm²/s and 0.35 mm²/s on injection of the fuel into the combustion chamber 120 at cruise conditions or to between 0.54 mm²/s and 0.34 mm²/s on injection of the fuel into the combustion chamber at cruise conditions. The controller 106 may be configured to control operation of the fuel-oil heat exchanger 114 to transfer heat from the oil to the fuel before the fuel is injected into the combustion chamber 120 at cruise conditions to lower the fuel viscosity to 0.48 mm²/s or lower, or further preferably to between 0.40 mm²/s and 0.48 mm²/s or even further preferably to between 0.42 mm²/s and 0.44 mm²/s.

In some examples, the controller 106 is configured to control operation of the fuel-oil heat exchanger 114 to lower the fuel viscosity to a maximum of any one of the following values: 0.58, 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31 or 0.30 mm²/s on injection of the fuel into the combustion chamber 120 at cruise conditions. Alternatively, the electronic engine controller 106 may be configured to control operation of the fuel-oil heat exchanger 114 to lower the fuel viscosity to a range defined between any two values in the previous sentence.

The fuel temperatures and fuel viscosities described above may be suitable for operation of the gas turbine engine 10 with a sustainable aviation fuel. The fuel provided to the combustor may comprise SAF, for example may comprise a % SAF in the range of 50-100%, 10%-50% or may be 100% SAF. The present application is not however limited to operation with sustainable aviation fuel, and any example described herein may be used with other types of fuel (which may have similar properties).

In some examples, the fuel distribution system 102 may be configured to provide a fuel to the plurality of fuel spray nozzles, wherein the fuel has a calorific value of at least 43.5 MJ/kg. In some examples, the fuel may have a calorific value of at least 43.8 MJ/kg. The calorific value may be between 43.5 MJ/kg and 44 MJ/kg. The calorific value may be 43.5, 43.6, 43.7, 43.8 43.9 or 44.0 MJ/kg, or in any range defined between any two of those values.

In any of the examples herein, the fuel distribution system may be configured to provide fuel to the fuel spray nozzles having a density in the range 760-840 kg/m³ at 15° C. This may in particular be in combination with the calorific values defined in the previous paragraph.

In order to provide fuel having any of the properties defined herein the fuel distribution system may be provided by a supply of fuel stored in one or more fuel tanks of the aircraft having such properties.

In some examples, the controller 106 is additionally or alternatively configured to control operation of the fuel-oil heat exchanger 114 to raise a temperature of the fuel to an average of at least 135° C. on injection of the fuel into the combustion chamber at cruise conditions.

In some examples, the controller 106 is additionally or alternatively configured to control operation of the fuel-oil heat exchanger 114 to transfer 200-600 kW/m³ of heat from oil to the fuel at cruise conditions before providing the fuel to the plurality of fuel spray nozzles.

In other examples, the controller 106 may be configured to control operation of the fuel-oil heat exchanger 114 to transfer 250-550 kW/m³, or more preferably 300-500 kW/m³, or even more preferably 350-450 kW/m³ of heat from oil to the fuel at cruise conditions before providing the fuel to the plurality of fuel spray nozzles.

In yet other examples the controller may be configured to control operation of the fuel-oil heat exchanger 114 to transfer 200 kW/m³, 225 kW/m³, 250 kW/m³, 275 kW/m³, 300 kW/m³, 325 kW/m³, 350 kW/m³, 375 kW/m³, 400 kW/m³, 425 kW/m³, 450 kW/m³, 475 kW/m³, 500 kW/m³, 525 kW/m³, 550 kW/m³, 575 kW/m³, 600 kW/m³ of heat, or any range defined between any two of these values, from oil to the fuel at cruise conditions before providing the fuel to the plurality of fuel spray nozzles.

In some examples, the controller 106 is additionally or alternatively configured to control operation of the gas turbine engine such that a reduction of 20-80% in an average of particles/kg of nvPM in the exhaust of the gas turbine engine 10 when the engine 10 is operating at 85% available thrust for given operating conditions and particles/kg of nvPM in the exhaust of the gas turbine engine 10 when the engine 10 is operating at 30% available thrust for the given operating conditions is obtained when a fuel provided to the plurality of fuel spray nozzles 124 is a sustainable aviation fuel instead of a fossil-based hydrocarbon fuel. In other examples, the nvPM reduction may be as otherwise defined herein.

The accessory gearbox 110 is driven by the engine via an accessory shaft (not shown). The accessory gearbox 110 is configured to power or drive various engine or aircraft accessory components. In the example shown, the accessory gearbox 110 is configured to drive the fuel pump 108, and an oil pump 130 forming part of the closed-loop oil system 128 described above. The accessory gearbox 110 is also configured to drive a generator 132 in order to provide power for engine electronics and/or electrical systems and/or aircraft electronics and/or electrical systems. In the example shown, the accessory gearbox 110 is mounted on the core 11 of the engine 10, although the accessory gearbox 110 may alternatively be mounted on the fan case 13a of the engine 10.

The closed-loop oil system 128 is configured to supply lubricating oil to the accessory gearbox 110. The average temperature of lubricating oil supplied to the accessory gearbox 110 may be between 75° C. and 120° C. at cruise conditions, whilst the average temperature of lubricating oil leaving the accessory gearbox 110 is between 180° C. and 230° C. at cruise conditions. The heated lubricating oil leaving the accessory gearbox 110 flows to the fuel-oil heat exchanger 114 in order to transfer heat from the heated lubricating to the fuel prior to the fuel being injected into the combustion chamber 120, as described above. The electronic engine controller 106 is configured to control operation of the fuel-oil heat exchanger 114 such that sufficient heat transfer takes place to adjust at least one of a temperature of the fuel on injection of the fuel into the combustion chamber 120 at cruise conditions and a viscosity of the fuel on injection of the fuel into the combustion chamber 120 at cruise conditions as described above.

Figure 5:
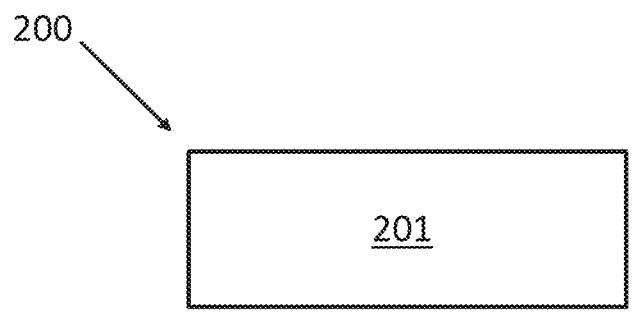
FIGS. 5, 6, 7, 8 and 9 show methods of operating a gas turbine engine in relation to fuel parameters including calorific value, density, temperature, and viscosity, as well as heat transfer to a fuel and concentration of nvPM in the exhaust of the gas turbine engine.

FIG. 5 illustrates a method 200 of operating a gas turbine engine. The method 200 comprises providing 201 a fuel to a plurality of fuel spray nozzles of the gas turbine engine, the fuel having a calorific value of at least 43.5 MJ/kg. The calorific value may be between 43.5 MJ/kg and 44 MJ/kg. The calorific value may be at least 43.8 MJ/kg. The calorific value may be between 43.8 MJ/kg and 44 MJ/kg. The calorific value may be 43.5, 43.6, 43.7, 43.8 43.9 or 44.0 MJ/kg, or in any range defined between any two of those values. In other examples, the calorific value may be any of the calorific values defined herein. The fuel may additionally have a density in the range 760-840 kg/m³ at 15° C. This may apply to any other of the methods described herein.

Figure 6:
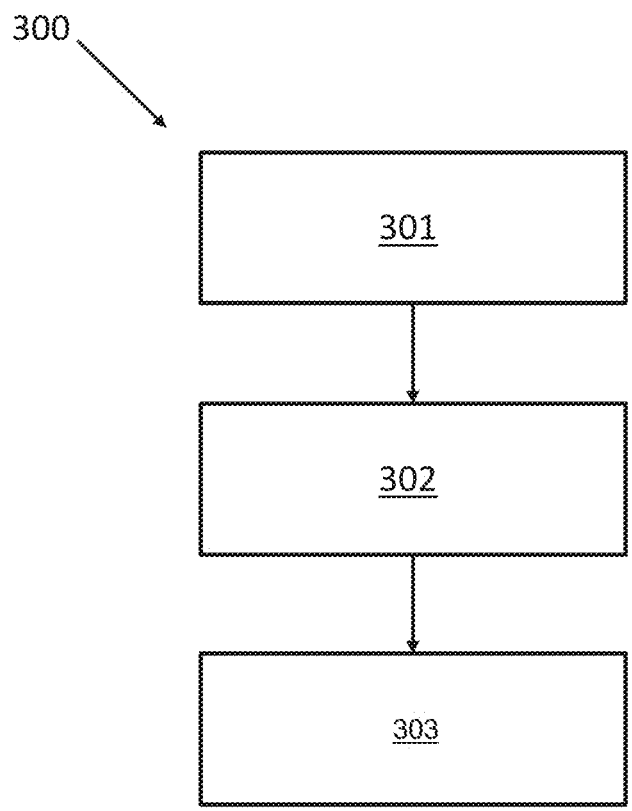

FIG. 6 illustrates a method 300 of operating a gas turbine engine. The method 300 comprises: providing 301 a fuel to one or more fuel-oil heat exchangers of the gas turbine engine; transferring 302 heat from oil to the fuel in the one or more fuel-oil heat exchangers; and providing 303 the fuel from the one or more fuel-oil heat exchangers to a plurality of fuel spray nozzles of a combustor of the gas turbine engine. During the transferring 302 step, heat is transferred from the oil to the fuel in the one or more fuel-oil heat exchangers to raise a temperature of the fuel to an average of at least 135° C. on injection of the fuel into a combustion chamber of the combustor at cruise conditions.

The method 300 may comprise transferring 302 heat from oil to the fuel in the one or more fuel-oil heat exchangers to raise a temperature of the fuel to an average of between 135° C. and 200° C. on injection of the fuel into the combustion chamber at cruise conditions.

The method 300 may comprise transferring 302 heat from oil to the fuel in the one or more fuel-oil heat exchangers to raise a temperature of the fuel to an average of between 145° C. and 180° C. on injection of the fuel into the combustion chamber at cruise conditions.

The method 300 may comprise transferring 302 heat from oil to the fuel in the one or more fuel-oil heat exchangers to raise a temperature of the fuel to an average of between 155° C. and 170° C. on injection of the fuel into the combustion chamber at cruise conditions.

The method 300 may comprise transferring 302 heat from oil to the fuel in the one or more fuel-oil heat exchangers to raise a temperature of the fuel to an average of 135° C., 140° C., 145° C., 150° C., 155° C., 160° C., 165° C., 170° C., 175° C., 180° C., 185° C., 190° C., 195° C., 200° C., or any range defined between any two of these values, on injection of the fuel into the combustion chamber at cruise conditions. In other examples, the heat transferred may be as otherwise defined herein.

Figure 7:
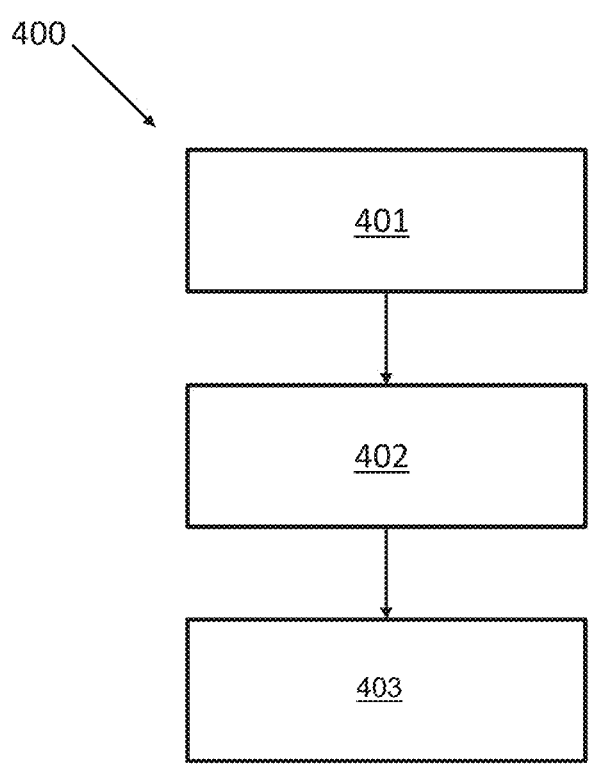

FIG. 7 illustrates a method 400 of operating a gas turbine engine. The method 400 comprises: providing 401 a fuel to one or more fuel-oil heat exchangers of the gas turbine engine; transferring 402 heat from oil to the fuel in the one or more fuel-oil heat exchangers; and providing 403 the fuel from the one or more fuel-oil heat exchangers to a plurality of fuel spray nozzles of a combustor of the gas turbine engine. Transferring 402 heat from the oil to the fuel comprises transferring 200-600 kW/m³ of heat from oil to the fuel in the one or more fuel-oil heat exchangers at cruise conditions before providing the fuel to the plurality of fuel spray nozzles.

Transferring 402 heat from the oil to the fuel may comprise transferring 250-550 kW/m³ of heat from oil to the fuel in the one or more fuel-oil heat exchangers at cruise conditions before providing the fuel to the plurality of fuel spray nozzles.

Transferring 402 heat from the oil to the fuel may comprise transferring 300-500 kW/m³ of heat from oil to the fuel in the one or more fuel-oil heat exchangers at cruise conditions before providing the fuel to the plurality of fuel spray nozzles.

Transferring 402 heat from the oil to the fuel may comprise transferring 350-450 kW/m³ of heat from oil to the fuel in the one or more fuel-oil heat exchangers at cruise conditions before providing the fuel to the plurality of fuel spray nozzles.

Transferring 402 heat from the oil to the fuel may comprise transferring 200 kW/m³, 225 kW/m³, 250 kW/m³, 275 kW/m³, 300 kW/m³, 325 kW/m³, 350 kW/m³, 375 kW/m³, 400 kW/m³, 425 kW/m³, 450 kW/m³, 475 kW/m³, 500 kW/m³, 525 kW/m³, 550 kW/m³, 575 kW/m³, 600 kW/m³ of heat, or any range defined between any two of these values, from oil to the fuel in the one or more fuel-oil heat exchangers at cruise conditions before providing the fuel to the plurality of fuel spray nozzles. In other examples, the heat transferred may be as otherwise defined herein.

Figure 8:
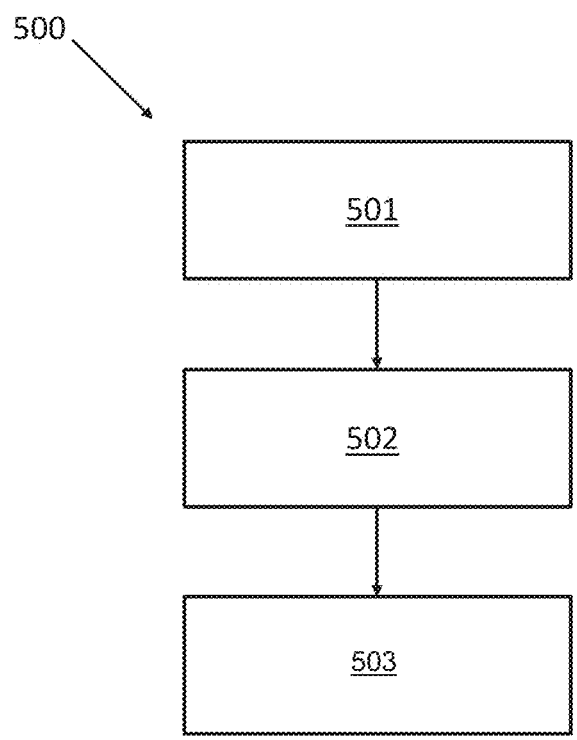

FIG. 8 illustrates a method 500 of operating a gas turbine engine. The method 500 comprises: providing 501 a fuel to one or more fuel-oil heat exchangers of the gas turbine engine; transferring 502 heat from oil to the fuel in the one or more fuel-oil heat exchangers; and providing 503 the fuel from the one or more fuel-oil heat exchangers to a plurality of fuel spray nozzles of a combustor of the gas turbine engine. During the transferring 502 step, heat is transferred from the oil to the fuel in the one or more fuel-oil heat exchangers to lower a viscosity of the fuel to 0.58 mm²/s or lower on injection of the fuel into the combustion chamber at cruise conditions.

The method 500 may comprise transferring 502 heat from oil to the fuel in the one or more fuel-oil heat exchangers to lower a viscosity of the fuel to between 0.58 mm²/s and 0.30 mm²/s on injection of the fuel into the combustion chamber at cruise conditions, or to between 0.50 mm²/s and 0.35 mm²/s on injection of the fuel into the combustion chamber at cruise conditions.

The method 500 may comprise transferring 502 heat from oil to the fuel in the one or more fuel-oil heat exchangers to lower a viscosity of the fuel to between 0.54 mm²/s and 0.34 mm²/s on injection of the fuel into the combustion chamber at cruise conditions.

The method 500 may comprise transferring 502 heat from oil to the fuel in the one or more fuel-oil heat exchangers to lower a viscosity of the fuel to between 0.50 mm²/s and 0.38 mm²/s on injection of the fuel into the combustion chamber at cruise conditions.

The method 500 may comprise transferring 502 heat from oil to the fuel in the one or more fuel-oil heat exchanges to lower a viscosity of the fuel to 0.48 mm²/s or lower on injection of the fuel into the combustion chamber at cruise conditions, or further preferably to between 0.40 mm²/s and 0.48 mm²/s or even further preferably to between 0.42 mm²/s and 0.44 mm²/s The method 500 may comprise transferring 502 heat from oil to the fuel in the one or more fuel-oil heat exchangers to lower a viscosity of the fuel to 0.58, 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31 or 0.30 mm²/s, or any range defined between any two of these values, on injection of the fuel into the combustion chamber at cruise conditions. In other examples, the fuel viscosity may be as otherwise defined herein.

Figure 9:
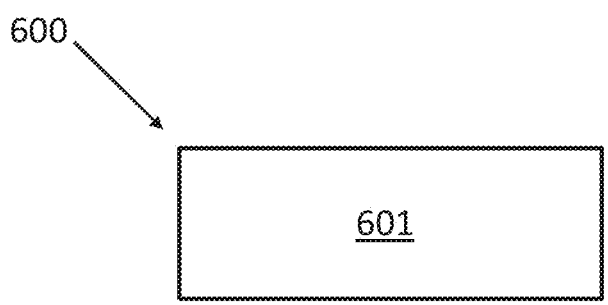

FIG. 9 illustrates a method 600 of operating a gas turbine engine. The method 600 comprises operating 601 the gas turbine engine such that a reduction of 20-80% in an average of particles/kg of nvPM in the exhaust of the gas turbine engine 10 when the engine 10 is operating at 85% available thrust for given operating conditions and particles/kg of nvPM in the exhaust of the gas turbine engine 10 when the engine 10 is operating at 30% available thrust for the given operating conditions is obtained when a fuel provided to plurality of fuel spray nozzles of the gas turbine engine is a sustainable aviation fuel instead of a fossil-based hydrocarbon fuel. In other examples, the nvPM reduction may be as otherwise defined herein.

The method 200, 300, 400, 500, 600 of any of FIGS. 5 to 9 may comprise operating the gas turbine engine 10 of FIG. 1, or the gas turbine of any other aspect or example defined herein. Any method disclosed herein may be used in conjunction with any apparatus disclosed herein.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of operating a gas turbine engine, the gas turbine engine comprising:
    a combustor, comprising an annular combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which the first subset of fuel spray nozzles are supplied with more fuel than the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5;
    one or more fuel-oil heat exchangers; and
    a plurality of ignitors;
the method comprising:
    providing a fuel to the one or more fuel-oil heat exchangers;
    transferring heat from oil to the fuel in the one or more fuel-oil heat exchangers; and
    providing the fuel from the one or more fuel-oil heat exchangers to the plurality of fuel spray nozzles; wherein
    heat is transferred from the oil to the fuel in the one or more fuel-oil heat exchangers to raise a temperature of the fuel to an average of between 135° C. and 200° C. on injection of the fuel into the combustion chamber at cruise conditions,
    the plurality of fuel spray nozzles are arranged circumferentially spaced around the combustor within a liner of the annular combustion chamber and positioned at a same radial distance from a rotational axis of the gas turbine engine, and
    the plurality of fuel spray nozzles are controlled differently such that the first subset of fuel spray nozzles are supplied with more fuel than the second subset of fuel spray nozzles below a staging point,
    wherein two of the fuel spray nozzles of the first subset are positioned circumferentially spaced from each other around the combustor,
    wherein each of the first subset of fuel spray nozzles is located nearer a respective one or more of the ignitors than the second subset, and
    wherein the plurality of ignitors are arranged circumferentially spaced around the combustor.

2. The method of claim 1, wherein the plurality of ignitors include 3, 5, 7 or 9 ignitors.

3. The method of claim 1, wherein the ratio of the number of fuel spray nozzles in the first subset of fuel spray nozzles to the number of fuel spray nozzles in the second subset of fuel spray nozzles is in the range of 1:3 to 1:4.

4. The method of claim 1, wherein the first subset of fuel spray nozzles includes between 1 and 10 fuel spray nozzles.

5. The method of claim 1, wherein the second subset of fuel spray nozzles includes between 10 and 25 fuel spray nozzles.

6. The method of claim 1, wherein the fuel provided to the plurality of fuel spray nozzles may comprise a % SAF in the range of 50-100%.

7. A gas turbine engine for an aircraft, comprising:
    a combustor, comprising an annular combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which the first subset of fuel spray nozzles are supplied with more fuel than the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5;
    a plurality of ignitors; and
    a fuel distribution system configured to provide a fuel to the plurality of fuel spray nozzles, comprising one or more fuel-oil heat exchangers and a controller; wherein
    the controller is configured to control the one or more fuel-oil heat exchangers so as to raise a temperature of the fuel to an average of between 135° C. and 200° C. on injection of the fuel into the combustion chamber at cruise conditions, and
    the plurality of fuel spray nozzles are arranged circumferentially spaced around the combustor within a liner of the annular combustion chamber and positioned at a same radial distance from a rotational axis of the gas turbine engine, and
    the plurality of fuel spray nozzles are controlled differently such that the first subset of fuel spray nozzles are supplied with more fuel than the second subset of fuel spray nozzles below a staging point,
    wherein two of the fuel spray nozzles of the first subset are positioned circumferentially spaced from each other around the combustor,
    wherein each of the first subset of fuel spray nozzles is located nearer a respective one or more of the ignitors than the second subset, and
    wherein the plurality of ignitors are arranged circumferentially spaced around the combustor.

8. The gas turbine engine of claim 7, wherein the plurality of ignitors include 3, 5, 7 or 9 ignitors.

9. The gas turbine engine of claim 7, wherein the ratio of the number of fuel spray nozzles in the first subset of fuel spray nozzles to the number of fuel spray nozzles in the second subset of fuel spray nozzles is in the range of 1:3 to 1:4.

10. The gas turbine engine of claim 7, wherein the first subset of fuel spray nozzles includes between 1 and 10 fuel spray nozzles.

11. The gas turbine engine of claim 7, wherein the second subset of fuel spray nozzles includes between 10 and 25 fuel spray nozzles.

12. The gas turbine engine of claim 7, wherein the fuel provided to the plurality of fuel spray nozzles may comprise a % SAF in the range of 50-100%.

13. The method of claim 1, wherein
the staging point defines the point at which the combustor switches between pilot-only operation and pilot-and-main operation.

14. The gas turbine engine of claim 7, wherein
the staging point defines the point at which the combustor switches between pilot-only operation and pilot-and-main operation.

* * * * *